UNITED STATES PATENT OFFICE.

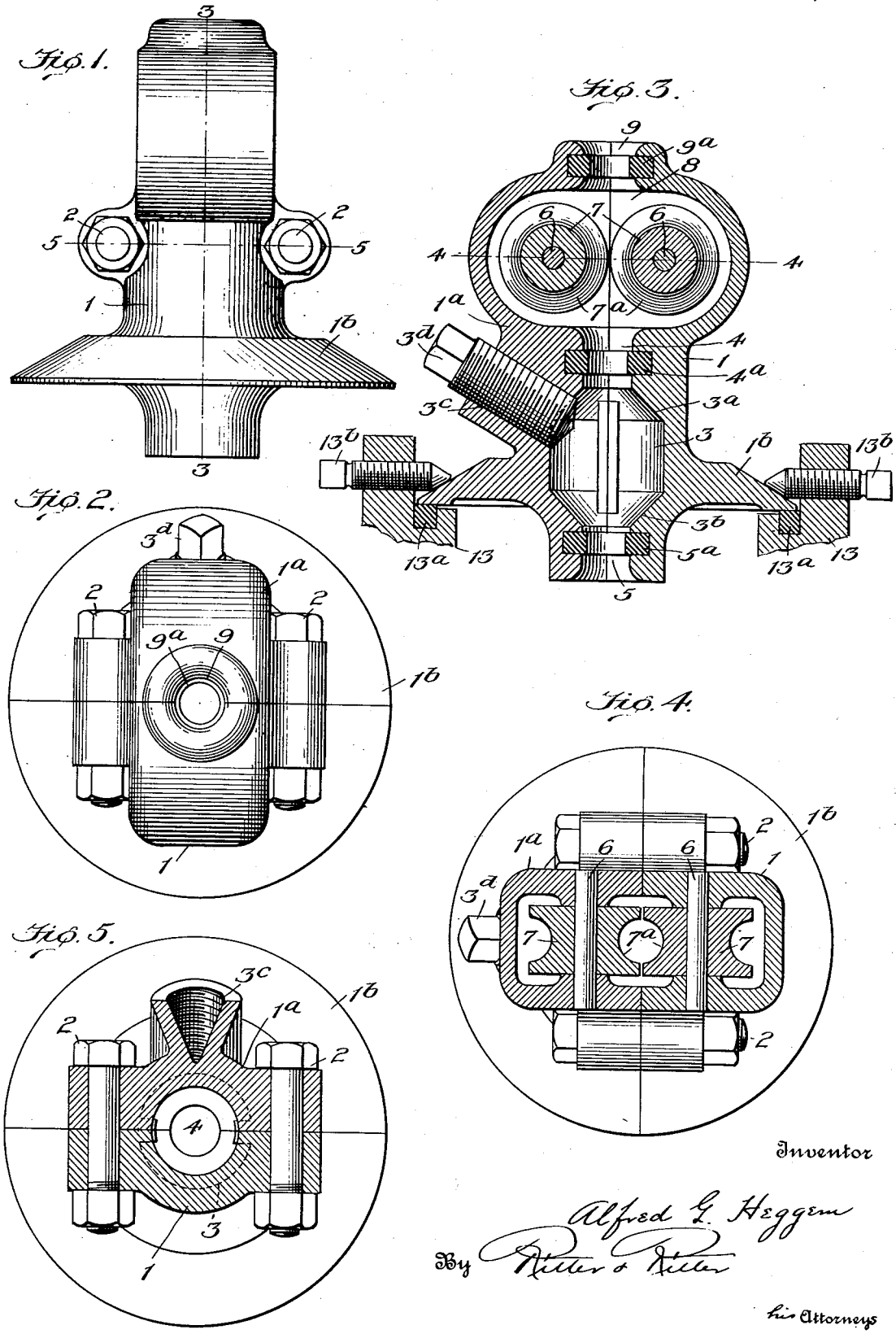

ALFRED G. HEGGEM, OF TULSA, OKLAHOMA.

STUFFING-BOX.

1,175,261.  Specification of Letters Patent. Patented Mar. 14, 1916.

Application filed May 24, 1915. Serial No. 30,111.

*To all whom it may concern:*

Be it known that I, ALFRED G. HEGGEM, a citizen of the United States, residing at Tulsa, in the county of Tulsa and State of Oklahoma, have invented certain new and useful Improvements in Stuffing-Boxes; and I do hereby declare the following to be a full, clear, and exact description of the invention, such as will enable others skilled in the art to which it appertains to make and use the same.

My invention relates to the construction of stuffing boxes of the class commonly employed to pack a reciprocating element, such for instance as a piston rod or a reciprocating cable, and has for its object the provision of efficient means for maintaining the direct linear movement of the reciprocating element and for preventing lateral vibration thereof in its movement in and through the stuffing box whereby irregularities of wear on the stuffing box and on the reciprocating element are obviated and the efficiency of the stuffing box is preserved.

To this end the principal feature of my invention, generally stated, involves the combination with a stuffing box comprising longitudinally separable sections and having alined openings for the passage of a reciprocating element, of rotatable guides, rollers, or spools which are located on opposite sides of the alined openings of the stuffing box and are adapted to have rolling contact with a reciprocating element passing therethrough.

A further feature of my invention involves the employment of a stuffing box having a packing chamber which is provided with alined openings for the passage of a reciprocating element and whose top and bottom or end walls are so shaped as to converge toward said openings, the walls of said openings having annular packing recesses and said stuffing box being comprised of longitudinally separable sections, whereby the operative relation of the packing to a reciprocating element which is movable through the stuffing box is effectively maintained and the renewal of the packing and the cleaning of the stuffing box, when necessary, is facilitated.

There are minor features of invention, involving particular combinations as well as special features of elemental construction, all as will hereinafter more fully appear.

In the drawings chosen for the purpose of illustrating my invention, the scope whereof is pointed out in the claims, Figure 1 is a side elevation of a stuffing box embodying my invention. Fig. 2 is a top plan view of the same. Fig. 3 is a longitudinal central section thereof taken in the plane of the line 3—3, Fig. 1. Fig. 4 is a transverse section taken in the plane of the line 4—4, Fig. 3. Fig. 5 is a transverse section taken on the plane of the line 5—5, Fig. 1.

Like syhbols refer to like parts wherever they occur.

In the drawings, 1 and $1^a$ indicate the two longitudinally separable sections constituting the stuffing box. These sections, as shown in the drawings, may be conveniently united by means of bolts 2.

The packing chamber 3 of the stuffing box is preferably of cylindrical form, intermediate of its ends, but having end portions of frusto-conical shape; that is to say, its end walls $3^a$ and $3^b$ preferably converge toward the respective alined openings 4 and 5, through which the reciprocating element with which the stuffing box is used moves. A threaded opening $3^c$ and a screw plug $3^d$ forming a closure therefor provide means for introducing and compressing the packing in chamber 3. The axis of the opening $3^c$ is preferably inclined to the axis of the alined openings 4 and 5.

In juxtaposition to the packing chamber 3 and on opposite sides of the axis of the openings 4 and 5 are located shafts 6 on which are journaled rollers or spools 7 in such position as to contact with the reciprocating element with which the stuffing box is used. These spools are preferably grooved on their peripheries, as at $7^a$, so as to embrace and substantially support the reciprocating element. The guide rollers 7 may be, and preferably are, located in a chamber 8 that is formed between the longitudinally separable sections of the stuffing box, and in such case there is provided a third opening 9 which is in alinement with the openings 4 and 5 that afford communication with the packing chamber 3.

The walls of the throats or alined openings 4 and 5 leading into and from the packing chamber 3 are provided with grooves for the reception of annular packing rings and wipers $4^a$ and $5^a$, and, if desired, the walls of the exterior opening or throat 9 communicating with the roller chamber 8 may also be recessed for the reception of a packing ring and wiper 9ª.

The stuffing box will, of course, be secured in position where it is to be utilized by any suitable means, but as one of the uses contemplated by me is in connection with the casing-head of an oil well, I have shown the stuffing-box as provided with a beveled bottom flange 1ᵇ which is adapted to be seated on a packing ring 13ª at the top of a casing head (a portion of which is shown at 13) and to be clamped thereon by the bevel ended screws 13ᵇ.

Forming the stuffing box in two longitudinally separable sections not only facilitates the finishing and assemblage of the coacting parts and thus materially simplifies and reduces the cost of manufacture, but, with the form of the packing chamber disclosed, it also facilitates the removal and renewal of the packings and the cleaning of the stuffing box when the same becomes necessary.

No particular character of packing material has been shown in the packing chamber 3 of the drawings, as I contemplate the use of any suitable packing material; but rubber, fiber, hard oil, or a combination of hard oil and fiber, such as lead or brass fiber with or without graphite, may be here mentioned as well adapted for the purpose.

Having thus described my invention, what I claim and desire to secure by Letters Patent is:

1. The combination with a stuffing box comprising longitudinally separable sections having alined openings for the passage of a reciprocating element, of a plurality of rotatable guide spools arranged on opposite sections of the box and on opposite sides of the axis of the alined openings of the stuffing box and adapted to contact with a reciprocating element passing through the stuffing box.

2. The combination with a stuffing box comprising longitudinally separable sections and having alined openings for the passage of a reciprocating element, of a plurality of rotatable guide spools having grooved peripheries, said spools being located on opposite sections of the box and on opposite sides of the axis of the alined openings in the stuffing box and being arranged to contact with said reciprocating element.

3. The combination with a stuffing box having a packing chamber, a guide spool chamber, and a passage connecting said chambers, of an annular packing in the passage which connects said chambers, and rotatable guide spools located in the spool chamber on opposite sides of the axis of the passage which connects the two chambers.

4. The combination of a longitudinally separable stuffing box having alined openings and a packing chamber whose ends converge toward the alined openings, said packing chamber having an opening for inserting packing into said chamber, and annular packings arranged in the said alined openings communicating with the packing chamber.

In testimony whereof I affix my signature.

ALFRED G. HEGGEM.